UNITED STATES PATENT OFFICE 2,299,933

METHOD OF PREPARING MINERAL FILLER

Richard J. Shaw, Phoenix, Ariz.

No Drawing. Application December 2, 1939,
Serial No. 307,339

4 Claims. (Cl. 117—46)

This invention relates generally to processes of pretreating mineral filler particles to be used with asphaltic or similar organic as distinguished from inorganic binding materials and is especially concerned with a novel process of this type for improving adhesion of the particles and binder.

It is a matter of common knowledge that bonding of filler particles and binder material depends at least to a major degree upon the wetting of the filler by the binder and absorption, at least superficially, of the binder into the filler. The present invention contemplates means for promoting this wetting and absorption.

It is well known in this art that the surfaces of most types of mineral filler particles are superficially coated with or comprise a film of oxygen-containing substances of a relatively inert nature and/or of adsorbed oxygen which interferes with establishement of proper bond between binder and particles. Moreover, due at least in a large measure to the fact that the coating maerials frequently are of a distinctly hydrophilic nature, there is little affinity for the relatively hydrophobic substances commonly used as binders and hence proper bonding is prevented. Also it has been observed that the oxygen-containing substances on the surfaces of untreated mineral filler particles at least tend to cause oxidation and hardening of the binder when mixed therewith with the result that an oxidized hard asphaltic substance is interposed between the particles and the binder impairing the strength of the bond. In addition to the foregoing, other factors such as charged adherent dust particles of colloidal dimensions and thin water films present on mineral filler particles inhibit proper bonding. When the bond between the binder and the filler particles is deficient the product is characterized by extreme friability, marked tendencies toward cracking, very poor resistance to weathering and, especially in instances where the product is immersed in water, rapid and complete disintegration.

Certain prior art processes of treating filler particles for purposes of improving bonding which it might be observed here failed to ameliorate the undesirable conditions mentioned above, include (1) coating the filler particles with melted asphaltic materials at low or at least not elevated temperatures and (2) mixing the filler particles with emulsified asphaltic substances. While both of these processes are distinguishable from the process according to the present invention, inasmuch as neither accomplishes the effects achieved thereby, they are further distinguished in that in each of them the conditions of treatment are such that reduction of the oxygen-containing materials on the surfaces of the filler particles is at least unlikely if not substantially impossible and moreover, as will hereinafter more clearly be apparent, no adherent carbonaceous film is provided on the surfaces of the particles, either to promote binding or protect the surfaces from further oxidation. Experience indicates that reduction of these oxygen-containing materials is a relatively high temperature reaction unless very strong reducing agents are employed. Hence it will be apparent that both of the mentioned prior art processes are deficient inasmuch as in each the treatment is at a relatively low temperature and in neither instance is a strong reducing agent present. In the process according to the present invention however both of these desirable conditions are present: the temperature of treatment is relatively high and strong reducing agents, incandescent carbon particles and carbon monoxide, are formed during treatment which under the prevailing conditions serve (1) to reduce the oxygen-containing substances present on the surfaces of the filler particles and (2) thereafter due in a measure at least to incomplete combustion, to deposit a thin but continuous adherent film of finely divided carbonaceous material on the freshly reduced surfaces promoting subsequent bonding and also protecting the surfaces from subsequent oxidation.

It follows therefore that it is among the most important objects of this invention to provide a novel process for pretreating mineral filler particles (1) to reduce oxygen-containing substances on the surfaces thereof inhibiting the formation of a tenaceous bond with asphaltic materials, and (2) thereafter to form on the freshly reduced surfaces a thin continuous adherent protective film of finely divided carbonaceous material.

Regarded in certain of its broader aspects the present invention comprises the novel process of treating mineral filler particles under reducing conditions to cause formation on the particle surfaces of a thin adherent, essentially continuous protective film of carbonaceous material and the product obtained thereby.

From a somewhat less general viewpoint, the novel process according to the present invention for treating mineral filler particles to promote bonding with organic binders comprises discretely enveloping the particles under reducing conditions and at an elevated temperature, with a substantially continuous adherent thin film of carbonaceous material. According to the presently preferred practice of this invention, the conditions of treatment include reduction with incandescent carbon particles in an atmosphere containing carbon monoxide caused by combustion of carbonaceous materials in an atmosphere insufficiently rich in oxygen, but this method of attaining the results following the practice of this invention is intended to be suggestive rather than limitative. The film of carbonaceous material formed on the filler particles as mentioned above can comprise finely divided carbon such as is commonly known as soot, carbon or lamp black, or may comprise mixtures of same with organic substances present under conditions of the reaction, such as relatively nonvolatile difficultly combustible compounds.

In order to facilitate a fuller understanding of the present invention a specific assembly of the practice of the process according thereto will now be described, but it is clearly to be understood that this matter is provided by way of example of how this invention may be practiced and not intended to be construed as a limitation upon either the invention or the subjoined claims.

Divided mineral filler particles such as pulverized or so-called "crushed" feldspar, quartz, microcline, divided granite or other aggregate materials are mixed with an organic substance of relatively low viscosity, such for instance as a benzene gasoline mixture, lower petroleum fractions or mixtures of petroleum fractions or the like with organic substances such as asphaltic materials or naturally occurring solid petroleum materials. It is especially preferred in the practice of this invention to mix the filler particles with a solution of asphaltic materials in volatile petroleum fractions. The mixture so obtained next is heated to a temperature at least above the flash point of the material mixed with the filler whereby the material is ignited. If the material comprises a solution of asphaltic substances in volatile petroleum fractions as above mentioned, combustion except in extraordinary circumstances will be incomplete and, accordingly, the flame produced, although not due to the presence of carbon monoxide and the like, will be incandescent because the incomplete combustion results in a zone of suspended incandenscent carbon particles within the flame. During the combustion of the organic material the reducing agents present, not the least potent of which are the incandenscent carbon particles and the carbon monoxide atmosphere, will cause reduction of oxygen containing substances in the superficial surface layers of the filler particles. It of course will be evident that the reduction will take place irrespective of whether the oxygen present is bound with molecules of reducible compounds or is present as elemental adsorbed oxygen. Inasmuch as the mineral filler particles are relatively cooler than the surrounding gases in the combustion zone, soot or divided carbonaceous material disposes upon the particle surfaces providing thereover an adherent essentially continuous thin protective film whereby, because of quality intrinsic in the film subsequent oxidation of or oxygen adsorption by the filler particles is to at least a major degree prevented. It of course will be apparent to those skilled in this art that during combustion of the organic material the filler particles and the material should be agitated to preclude the possibility of combustion of only a superficial portion of the mixture. The qualities of the combustion zone of course can be regulated by adjustment of the oxygen content.

The product obtained by practicing the process above described is characterized in that the filler particles are discretely enveloped by a thin tenaciously adherent essentially continuous film of carbonaceous material. The film is essentially hydrophobic in nature and is characterized by a marked affinity for organic binders such as bituminous or asphaltic substances.

Having thus described the present invention, what it is desired to secure by Letters Patent is:

1. A process for preparing mineral filler particles to facilitate bonding them subsequently with organic binding material, comprising completely coating the filler particles with a thin coating of asphaltic material, igniting the asphaltic coating material in a deficiency of oxygen and thereby incompletely consuming said coating and reducing oxygen-containing substances on the surfaces of said particles and leaving a thin tenaciously adherent film of carbon surrounding said filler particles.

2. The process of preparing mineral filler particles to facilitate bonding with organic binding material, comprising completely coating the filler particles with a readily combustible organic substance of low viscosity, igniting the coating and incompletely consuming the same in a deficiency of oxygen whereby to eliminate, by reduction, oxygen from the surfaces of the particles and to leave a thin tenaciously adherent continuous film of finely divided carbonaceous material surrounding the filler particles.

3. The process of preparing mineral filler particles to facilitate bonding with organic binding material, comprising completely coating the filler particles with thin asphaltic material, igniting the coating of asphaltic material in an atmosphere deficient in oxygen for incompletely consuming the same whereby to eliminate oxygen adsorbed on the particles by reducing said oxygen and to leave a thin tenaciously adherent continuous film of finely divided carbon surrounding the filler particles.

4. A method for preparing mineral filler particles to facilitate bonding thereof with organic binding material, comprising completely coating the filler particles with asphaltic material dissolved in volatile petroleum fractions, heating the coated particles to a temperature above the flash point of the petroleum fractions and igniting the coating of asphaltic material dissolved in said petroleum fractions and allowing the same to be incompletely consumed leaving a thin tenaciously adherent continuous film of finely divided carbon surrounding the particles and reducing adsorbed oxygen on the particles.

RICHARD J. SHAW.